United States Patent [19]
Aronoff et al.

[11] 3,773,035
[45] Nov. 20, 1973

[54] SPECIMEN OBTAINING, CULTURING AND TESTING DEVICE HAVING A GAS ENVIRONMENT

[76] Inventors: Michael S. Aronoff, 1906 Sussex Dr.; Michael K. Workman, Rt. 11, both of Bloomington, Ind. 47401

[22] Filed: Sept. 5, 1972

[21] Appl. No.: 286,015

[52] U.S. Cl.............. 128/2 W, 128/269, 195/109, 195/127, 195/103.5
[51] Int. Cl............................................. A61b 10/00
[58] Field of Search .................. 128/2 R, 2 W, 2 B, 128/269; 195/127 X, 109 X, 103.5, 139

[56] References Cited
UNITED STATES PATENTS

| | | | |
|---|---|---|---|
| 2,847,000 | 8/1958 | Nieburgs | 128/2 B |
| 3,246,959 | 4/1966 | Brewer | 195/109 X |
| 3,308,039 | 3/1967 | Nelson | 128/2 W X |
| 3,450,129 | 6/1969 | Avery et al. | 128/2 W |

*Primary Examiner*—Aldrich F. Medbery
*Attorney*—C. David Emhardt

[57] ABSTRACT

A culturing device for gonorrhea including a $CO_2$ cylinder having a swab mounted thereon and closed by a rubberlike diaphragm. The swab is projectable from a cylindrical container for obtaining a specimen. The cylindrical container has a threaded cap thereon and contains a culture medium. The cap has a lance mounted thereon which is usable when the cap is closed on the container to puncture the diaphragm to cause $CO_2$ to fill the cylindrical container. The $CO_2$ cylinder is movable in the cylindrical container to cause the swab to wipe across the culture medium and thereby cause the specimen to be deposited from the swab on the culture medium.

8 Claims, 3 Drawing Figures

PATENTED NOV 20 1973 3,773,035

൩,൭൭൩,൦൩൫

SPECIMEN OBTAINING, CULTURING AND TESTING DEVICE HAVING A GAS ENVIRONMENT

BACKGROUND OF THE INVENTION

1. Field of the Invention

This invention relates to a testing apparatus particularly adapted for testing for gonorrhea.

2. Description of the Prior Art

There are available on the market various methods and means for testing for gonorrhea. Some of the prior art testing systems are disclosed in the U. S. Pat. Nos. to Ingvorsen 3,388,043, E. Nelson 3,308,039, Landau 3,205,151 and R. Nelson 3,661,717. The gonococcus organism is very fragile and, consequently, the above mentioned systems and other prior art systems are not entirely satisfactory in maintaining the organism alive for a sufficient length of time to permit completion of the test. One of the reasons why the prior art devices are not completely satisfactory is that they do not maintain the proper $CO_2$ enriched atmosphere surrounding the organism. Still another disadvantage of prior art systems is that they are difficult to use in obtaining a specimen.

SUMMARY OF THE INVENTION

The present invention is a culturing device including a container of $CO_2$ with a swab mounted thereon. The cylinder and swab are received within a second container from which they are projectable in order to obtain a specimen on the swab. A culture medium is located within the second container and is positioned to receive the specimen from the swab when the $CO_2$ container and swab are retracted. The second container has a cap thereon with a lance which is used to puncture the $CO_2$ container.

Objects of the invention are to provide an improved testing device and to provide a device for culturing gonococcus which maintains the gonococcus alive. Still another object of the invention is to provide a testing device which makes easy the obtaining of a gonorrhea specimen.

Related objects of the invention will become apparent as the description proceeds.

DESCRIPTION OF THE PREFERRED EMBODIMENT

Figure 1:
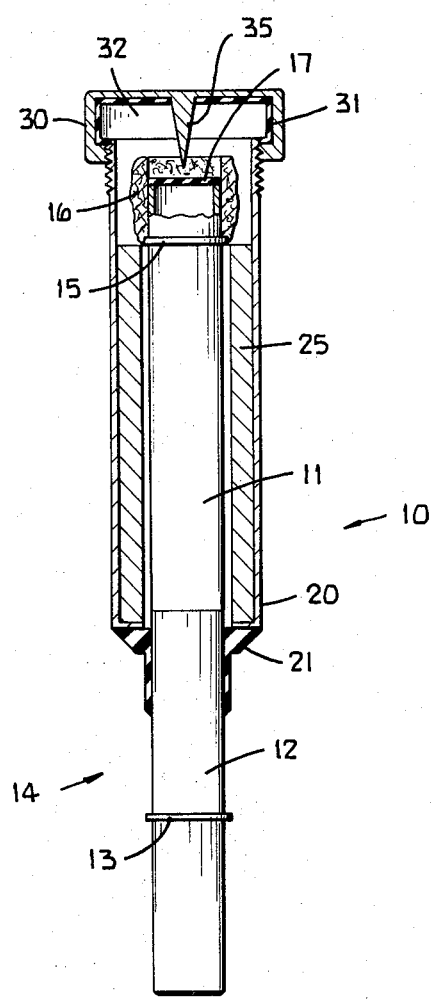
FIG. 1 is a longitudinal section of a testing device embodying the present invention.

For the purpose of promoting an understanding of the principles of the invention, reference will now be made to the embodiment illustrated in the drawings and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is illustrated a culturing device which includes a cylindrical tube or container 11 containing $CO_2$ under pressure. Threadedly connected to the lower end of the $CO_2$ container 11 is a cylindrical extension 12 which has a stop 13 thereon and which, with the $CO_2$ container, functions as a plunger 14. The stop 13 is a raised collar integral with the member 12 and extending completely around the member. The $CO_2$ container 11 also has a stop 15 thereon, said stop being integral with or fixed to the container 11 and extending completely around the container. A Dacron swab 16 is secured to the upper end portion of the cylindrical container 11. The container 11 of $CO_2$ is closed by a rubberlike diaphragm 17. The plunger 14 is slidable within a container 20 which has fixedly mounted at its lower end a rubberlike seal member 21 surrounding the member 12 and preventing gas from flowing into or out of the container 20. The rubberlike seal 21 forms a part of the lower end of the container 20 and also functions to limit the movement of the plunger by engagement with the stops 13 and 15. Thus the members 11 and 12 are movable in one direction until the stop 15 engages the seal 21 (or the lower end of container 20) and in the other direction until the stop 13 engages the seal 21.

Received within the container 20 is a culturing medium 25 which may consist of agar-agar. It will be noted that the swab 16 is sufficiently large so that any specimen on its external surface will be wiped across and received upon the medium 25 by movement of the plunger downwardly from the position illustrated in FIG. 1. A cap 30 is threadedly received upon the container 20 and includes a rubberlike internal seal or a lining 31.

When the cap 30 is closed down and tightly threaded on the container 20, the opening 32 at the upper end of container 20 is sealed and gas cannot pass through it, either out of the container 20 or into the container 20. Mounted upon a cap 30 is a lance 35 which may be used, when the cap is secured in place as illustrated in FIG. 1, to puncture the rubberlike diaphragm 17 and to permit the $CO_2$ gas under pressure within the container 11 to move into the container 20 to surround and cover the culture medium 25 in order to preserve or maintain alive the gonococcus organism. It will be noted that when the lance 35 is used to puncture the rubberlike diaphragm 17, the interior of the container 20 is completely sealed off to atmosphere so that the $CO_2$ does not escape from the container 20.

In order to use the present device, the device is normally provided in a mailing tube (not shown) which has a length sufficiently great to receive the device when the number 12 is pulled completely downwardly as viewed in FIG. 1 so that the stop 15 has engaged the lower end of the container 20 adjacent the seal 21. In its initial configuration, however, the device is as illustrated in FIG. 1 in the mailing tube. The cap 30 of the device 10 is then removed and the plunger 14 is pushed upwardly until the swab projects from the opening 32 and the stop 13 engages the seal 21. The specimen is then obtained by inserting the swab into the orifice to be cultured. After the specimen has been obtained, the swab is returned to the position illustrated in FIG. 1 and the cap 30 is replaced on the container 20. The member 12 is then pushed upwardly as illustrated in FIG. 1 to cause the lance 35 to puncture the diaphragm 17. The plunger 14 is then pulled downwardly causing the swab 16 to wipe against the medium 25 until the stop 15 engages the lower end of the container 20. The device 10 is then placed within the mailing tube and is mailed to the testing laboratory.

Figure 2:
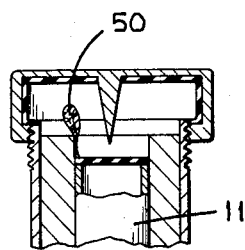
FIG. 2 is a fragmentary view of an alternative form of the invention, said view being similar to FIG. 1 but only showing a portion of the structure illustrated in FIG. 1.

Referring to FIG. 2, there is illustrated an alternative form of the apparatus which is intended for use by the male as opposed to the female. The device of FIG. 1 is intended for use by the female. It will be noted that the device in FIG. 2 is generally the same as the device in FIG. 1 with the exception that the relatively large swab 16 is replaced by a smaller swab 50 also mounted on the $CO_2$ container 11. The swab 50 is used to obtain a specimen from the male urethra. After the specimen has been obtained, the specimen is deposited upon the medium 25 in the same fashion as described above with regard to FIG. 1.

Figure 3:
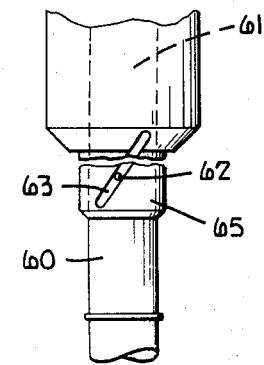
FIG. 3 is a fragmentary side elevation of still another alternative embodiment of the present invention.

In FIG. 3, a device is illustrated for insuring that the specimen obtained by either the device of FIGS. 1 or 2 is spread out on the culture medium In FIG. 3, the member 60 represents the member 12 in FIG. 1 and is secured fixedly to the $CO_2$ cylinder 61. Affixed to the member 60 is a pin 62 which projects outwardly through a slot 63 formed in the seal 65. Of course the seal 65 corresponds to the seal 21 of FIG. 1. When the member 60 is moved vertically in FIG. 3, and the pin 62 moves from one end to the other of slot 63, the swab, whether it be 16 or 50, is caused to rotate or to move in a spiral or helical path thus assuring that the specimen is spread out over the media 25. It should be mentioned that other structure for accomplishing this purpose might be provided. For example, the slot 63 might be placed in the external surface of the member 60 and the pin mounted on the seal 65.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A testing device comprising:
a first container of gas,
a second container having said first container therein,
closure means on said second container,
a culture medium within said second container,
a swab mounted on said first container, and projectable from said second container to obtain a specimen, said first container being movable through said second container to move said swab across said medium to deposit said specimen on said medium,
and means for puncturing said first container with said closure means to permit gas to pass out of said first container and surround said medium in said second container.

2. The testing device of claim 1 wherein said means for puncturing comprises a lance mounted on said closure means said closure means being a screw threaded cap threadedly received on said second container.

3. The testing device of claim 2 wherein said first container is cylindrical and said second container is cylindrical and coaxial with said first container, said second container having a cylindrical inside surface and having said medium covering at least a portion of said inside surface.

4. The testing device of claim 3 wherein said second container has two openings one of which is closed by said closure means and through the other of which said first container projects, said first container having one end adjacent said one opening, said swab being mounted on said one end whereby said swab is projected when said first container is projected through said one opening, said first container having a stop thereon which engages said second container to prevent further projection of said first container from said second container when said first container and swab are projecting from said one opening.

5. The testing device of claim 4 wherein said first container has a second stop thereon which engages said second container to prevent further projection of said first container from said second container through the other of said two openings.

6. The testing device of claim 2 wherein said swab surrounds said first container.

7. The testing device of claim 2 wherein said swab is mounted on one side of said first container.

8. The testing device of claim 3 wherein said first and second containers have a pin and slot arrangement connecting them, said slot having a helical configuration causing said containers to rotate relative to one another as they are moved axially relative to one another.

* * * * *